United States Patent [15] 3,677,104
Hirozawa et al. [45] July 18, 1972

[54] SPEED CHANGE MECHANISM

[72] Inventors: Koichiro Hirozawa; Tadao Asano, both of Kariya, Japan

[73] Assignee: Aisin Seiki Kabushiki Kaisha, Kariya, Aichi, Japan

[22] Filed: Oct. 7, 1970

[21] Appl. No.: 78,706

[30] Foreign Application Priority Data

Oct. 7, 1969 Japan..................................44/80051
Oct. 7, 1959 Japan..................................44/80052

[52] U.S. Cl..................................74/336, 74/337.5, 74/388
[51] Int. Cl..........................................F16h 5/48, F16h 5/40
[58] Field of Search..............................74/337.5, 336, 388 R

[56] References Cited

UNITED STATES PATENTS 1,345,497 7/1920 Kempin..................................74/337.5
2,178,356 10/1939 Brunner..................................74/336
2,311,010 2/1943 Vickers..................................74/388 R
2,590,232 3/1952 Chilton..............................74/337.5 X
2,756,611 7/1956 Harris..................................74/336 X
3,324,745 6/1967 Szodfridt..............................74/752 C
3,457,798 7/1969 Musgrave..............................74/337.5

Primary Examiner—Carlton R. Croyle
Assistant Examiner—Thomas C. Perry
Attorney—Sughrue, Rothwell, Mion, Zinn & Macpeak

[57] ABSTRACT

The usual shift collars in a speed change mechanism are operated by a plurality of shift forks. The shift forks are operable under the control of a cam disc having one or more cam grooves therein in which are located a plurality of control pins secured to each shift fork respectively. The cam disc is rotated by means of a hydraulic servo motor which is operable under the control of a vehicle speed responsive device.

7 Claims, 5 Drawing Figures

INVENTORS
TADEO ASANO
KOICHIRO HIROZAWA
BY Sughrue, Rothwell, Mion, Zinn & Macpeak
ATTORNEYS

SPEED CHANGE MECHANISM

This invention relates to improvements in and relating to an automatic speed change mechanism for automatically executing the selection of gear engagement in the speed change operation of gear type speed changer.

In the conventional gear type speed changer, it was required for selecting the gear engagement to provide a servo means with each fork member. Since it was impossible to simultaneously operate this servo means especially in case of clutch means or brake device provided in planetary gear means, at least two fork members had to be separately controlled, which involved the complicated construction and constituted the drawback inherent in the prior art.

Furthermore in case of automatic speed change operation, the prior art was not exempted from the same drawback of the complicated structure, owing to the considerable increase of number of feed-back circuits required for the intended automatic speed change.

The main object of the present invention is to provide a highly reliable and simplified speed change mechanism capable of substantially obviating the above-mentioned drawbacks inherent in the prior art by controlling more than two speed change rods by the use of cam assembly, so that even a single feed-back circuit can attain the desired object of the invention irrespective of the increase of number of speed change rods.

It is a further object of the invention to provide an improved speed change mechanism which ensures the operation of decreasing rotational force in highly efficient manner for moving a speed change rod by the use of a cam groove member in a cam assembly for controlling a plurality of speed change rods.

These and further objects, features and advantages of the invention will become more apparent when read the following detailed description of the invention by reference to the accompanying drawings, in which.

Figure 1:
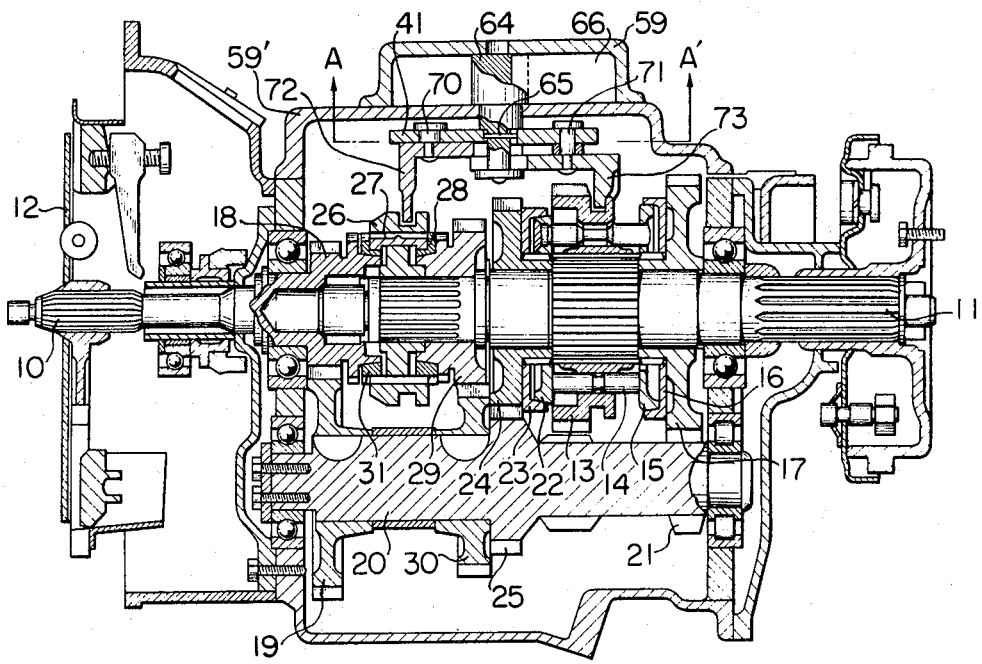
FIG. 1 is a substantially sectional side view illustrative of a preferred embodiment of the speed change mechanism according to the present invention.

Referring now to FIG. 1, illustrative of a synchronous mesh type speed changer according to the present invention, the numeral 10 denotes an input shaft; 11 an output shaft; and 12 a friction clutch unit for intermittent connection between an internal combustion engine and a transmission mechanism.

In case of a first speed change operation, a low side sleeve member 13 having its internal spline meshed with that of the output shaft 11 is moved rightwardly by fork members hereinafter referred to, so that a first synchronizer inner ring 15 is urged against an outer ring 16 thereof via a pin 14. Consequently, the frictional force acting on the conical surface of the inner ring 15 and the outer ring 16 causes the both rings to be integral with each other, which results in the synchronization of a first gear 17 and the output shaft 11. Thereafter, the sleeve member 13 and the first gear 17 are spline-connected to each other, and the output shaft 11 is driven from an input gear 18 of the input shaft 10 via a counter input gear 19, a counter shaft 20, a counter low gear 21, the first gear 17 and the low side sleeve member 13.

Next, in case of a second speed change operation, leftward movement of the sleeve member 13 by the fork member disengages the spline-meshing of the sleeve 13 and the first gear 17, and a second synchronizer inner ring 22 is brought into pressure contact with an outer ring 23 thereof via a pin 14. Consequently, a second gear 24 and the output shaft 11 are synchronized with each other owing to the integration of the inner ring 22 and the outer ring 23 due to frictional force acting on the conical surface of the both rings. After the synchronization, the sleeve member 13 is spline-connected to the second gear 24, and the output shaft 11 is driven from input gear 18 of the input shaft 10 via counter input gear 19, counter shaft 20, counter second gear 25, second gear 24 and the sleeve member 13.

In case of a third speed change operation, the low side sleeve member 13 is moved towards right to be returned to the position indicated in the drawing. The rightward movement of a high side sleeve member 26 having its internal spline engaged with that of the output shaft 11 serves to rightwardly push a third synchronizer ring 28 via a key 27 to be brought into pressure contact with a third gear 29. Consequently, the third gear 29 and the third ring 28 become integral with each other owing to the frictional force acting on the conical surface of the both members, which causes the synchronization of the both members 28 and 29. Thereafter, the high side sleeve member 26 is spline-connected to the third gear 29, and the output shaft 11 is driven from the input gear 18 of the input shaft 10 via counter input gear 19, counter shaft 20, counter third gear 30, third gear 29 and high side sleeve member 26.

In case of a top speed change operation, the high side sleeve member 26 is leftwardly moved to disengage the spline-engagement of the third gear 29 and the sleeve member 26, and to leftwardly push a top synchronizer ring 31 to bring it into pressure contact with the input gear 18. Consequently, the frictional force acting on the conical surface of the input gear 18 and the top synchronizer ring 31 causes the both to be integral with each other, thereby effectuating the synchronization of the both. Thereafter, the high side sleeve member 26 is spline-connected to the input gear 18, and the output shaft 11 is driven from the input gear 18 of the input shaft 10 via the high speed sleeve member 26.

The foregoing explanation on the construction and operation of a preferred embodiment according to the present invention is concerned with the forward drive stage only, but in case of the rear drive stage, the drive is executed by the same manner of operation as the conventional one by the use of manually operable lever irrespective of a preferred embodiment of the present invention.

Figure 3:
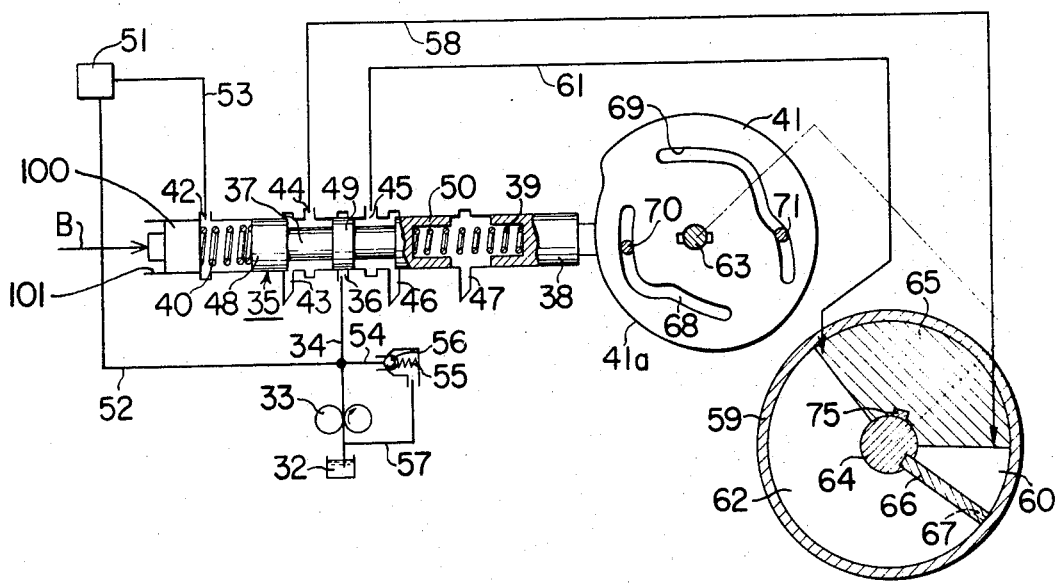
FIG. 3 is a schematic and explanatory view of control arrangement of the mechanism.

Next, the control arrangement for the present speed change mechanism is explained hereinafter. In FIG. 3, the numeral 32 denotes an oil tank, and the fluid contained in the oil tank 32 is arranged to be delivered by a pump 33 to a port 36 of a shift valve assembly 35 through a conduit 34. The shift valve assembly 35 comprises a shift valve 37 and a down-shift plug 38 at the right side thereof, a spring 39 being interposed therebetween. There is provided a spring 40 between the left end of the shift valve 37 and the left end wall surface of the valve assembly 35. The right end portion of the down-shift plug 38 is in contact with a cam surface 41a of a cam plate 41 hereinafter referred to. Furthermore, ports 42, 43, 44, 45, 46 and 47 are disposed in the shift valve assembly 35, and there are provided in the shift valve 37, a land 48 for controlling the port 43, a land 49 for controlling the port 36 and a land 50 for controlling the port 46. The numeral 51 denotes a governor unit for producing hydraulic pressure corresponding to revolutions of wheel shaft, and the hydraulic pressure produced by the pump means 33 is conducted through a conduit 52. The pressure of the governor unit 51 is arranged to be conducted to the port 42 through a conduit 53.

The surplus fluid other than that required for the supply to conduits 34 and 52 pushes a ball 56 against the force of a spring 55 and is fed back to conduit 57 through conduit 54. Therefore, the fluid pressure inside of the conduits 34 and 54 is always kept to be constant. The pressure conducted to the port 44 enters into an up-shift chamber 60 of a servo cylinder 59, passing through a conduit 58, and the pressure conducted to the port 45 enters into a down-shift chamber 62 through a conduit 61. The aforementioned cam plate 41 has a rectangular bore 63 engaged with a pin 65 which is mounted on a shaft 64, and is thus fixed onto the shaft 64, thereby said cam plate 41 being rotatable in conjunction with the shaft 64. Furthermore, the shaft 64 is rotatable by being journaled between the casing of the servo cylinder 59 and the casing 59' for a covering member of the cam plate 41. A piston 66 is fixedly attached to the shaft 64, said piston rotating in the servo cylinder 59. At the top end of the piston 66 there is mounted a sealing member 67 for sealing an inner surface of the servo cylinder 59. Cam grooves 68 and 69 are independently and oppositely disposed in the cam plate 41, and are engaged with pins 70 and 71, respectively. Fork members 72 and 73 are fixedly attached to the lower ends of pins 70 and 71, respectively, said fork members serving to move the high side sleeve 26 and the low side sleeve 13 leftwardly and rightwardly, as has been hereinbefore described. In FIG. 3, the numeral 74 denotes a separator in the servo cylinder 59, and 75 a sealing member for the separator 74 and the shaft 64.

An operation of the control arrangement which has been described in the foregoing is explained as follows:

The fluid contained in oil tank 32 is delivered by pump 33 to port 36 of the shift valve assembly 35 via conduit 34. For the starting of an automotive vehicle, shift lever of the speed changer is moved to the first speed position. The shift lever which is illustrated schematically by the arrow B actuates the shift valve assembly 35 to execute the first speed change operation. A plug 100 is slidable in the bore 101 of the shift valve assembly and bears against one end of spring 40. The plug 100 is shifted by the lever B and thereby actuates the shift valve 37 through the spring 40. With number of the revolutions increased and consequently the hydraulic pressure of governor unit 51 elevated, the pressure is supplied to port 42 through conduit 53, which causes shift valve 37 to be rightwardly pushed in FIG. 3 to open port 36 closed by land 49. Thus the port 36 is communicated with the port 44.

Consequently, the pressure fluid supplied from pump 33 is conducted to conduit 58, and is brought into up-shift chamber 60 of servo cylinder 59 to push piston 66. Therefore, shaft 64 is rotated toward clockwise direction in conjunction with piston 66. Simultaneously, cam plate 41 fixed on shaft 64 is also rotated in the clockwise direction. Therefore, pins 70 and 71 engaged in cam grooves 68 and 69 are moved towards right and left along said grooves to likewise move fork members which are fixedly attached to said pins 70 and 71, and high side sleeve 26 as well as low side sleeve 13 is likewise moved for the speed change operation.

By rotation of cam plate 41 in the clockwise direction, cam surface 41a is moved in the same direction, and acts to push down-shift plug 38 towards left owing to the gradually increased diameter thereof. Shift valve 37 is pushed back to the position in the drawing through spring 39 to cause port 36 to be closed by land 49. Then the pressure supply to up-shift chamber 60 is terminated to keep piston 66 as well as fork members 72 and 73 in their determined positions, thus maintaining the speed change operating condition corresponding to the number of revolutions.

With the number of revolutions decreased and governor pressure of the governor unit 51 lowered, shift valve 37 is leftwardly moved to cause land 49 to open port 36, and port 36 is communicated with port 45, thereby supplying the pressure to down-shift chamber 62 through conduit 61. Piston 66 is moved in conjunction with shaft 64 toward counterclockwise direction, and also fork members 72 and 73 are moved toward the counterclockwise direction via cam plate 41, and pins 70 and 71 so as to release the aforementioned speed change operating condition, thus providing the possibility of switching to another speed change operation according to the number of revolutions.

Shift valve 37 is simultaneously returned to the position shown in the drawing by movement of cam surface 41a . On account of closure of port 36 by land 49, fork members 72 and 73 keep the position as they moved, and maintain this speed change operating condition. In this case the speed change can be responded to engine output by controlling governor pressure by the engine output.

In the foregoing embodiment according to the present invention, the servo cylinder 59 is of rotatable type, but it may be also of linear type. Furthermore, in case of semi-automatic type mechanism, it may be so arranged that the shift lever "B" is connected to the shift valve assembly 35 as indicated by the dotted chain line in FIG. 3, and the shift valve is moved without introducing governor pressure from the governor unit.

Figure 2:
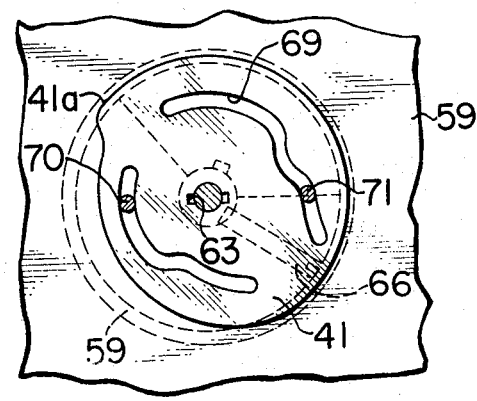
FIG. 2 is a sectional view taken along the section line A—A' of FIG. 1, wherein a cam assembly is shown.
Figure 4:
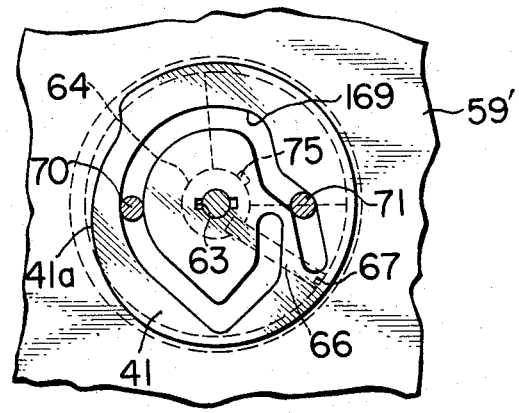
FIGS. 4 and 5 are each a similar view to FIG. 2, wherein however modified modes of the cam assembly in FIG. 2 are shown.
Figure 5:
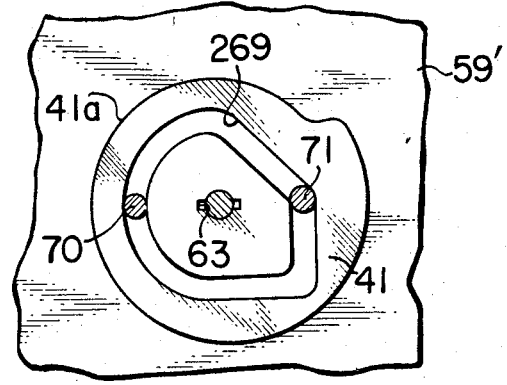

In FIGS. 4 and 5, there are shown cam grooves 169 and 269, respectively, having different configurations from the cam grooves 68 and 69 shown in FIG. 2. Namely, in FIG. 2, the cam grooves 68 and 69 are disposed in such a manner that the both grooves are independent of and opposite to each other, whereas in FIG. 4 the unitary cam groove 169 is provided with the both ends which do not meet each other.

In FIG. 5, the unitary cam groove 269 has no such free end portions and is continuous throughout the groove. It is, however, noted that there exist no substantial differences between the grooves in FIG. 2 and those in FIGS. 4 and 5 with regard to the operation and technical effects, except in that the singleness of the groove shown in FIGS. 4 and 5 makes it possible to reduce an inclination angle of the cam surface, which ensures reliable control operation with less rotational power and without requiring a large diameter of the cam.

From the foregoing, it will be understood that the speed change mechanism according to the present invention is of highly simplified construction wherein there are provided a cam assembly for the displacement of the speed change rod, a servo mechanism for actuating said cam assembly, a shift valve assembly for supplying power to the servo mechanism said shift valve assembly being unidirectionally moved by automotive vehicle speed responsive means and so arranged that it will return to the original position by being moved in the reverse direction. Therefore necessity of additionally providing a servo mechanism for individually controlling at least two speed change rods. Furthermore, highly reliable control operation is ensured by the present invention.

What is claimed is:

1. In a speed change mechanism having an input shaft, an output shaft and gear means arranged between both shafts capable of providing a plurality of speed change ratios between said shafts by the proper selection of said gears, said speed change mechanism comprising a power source, gear shifting means having speed change pin means secured thereto, a cam assembly for displacing said speed change pin means for the proper selection of said gears, servo means operatively connected to said cam assembly, a shift valve assembly for imparting power from said power source to said servo means so as to displace said servo means and said cam assembly in one of two opposite directions, and vehicle speed responsive means for producing a signal in response to the vehicle speed whereby said shift valve assembly is moved unidirectionally by said responsive means and is also movable in the reverse direction by the displacement of said cam assembly.

2. In a speed change mechanism as set forth in claim 1 wherein said speed change pin means are engaged in a cam groove member of said cam assembly.

3. In a speed change mechanism as set forth in claim 1, wherein said servo means comprises a servo cylinder, a rotatable piston disposed in said servo cylinder and two chambers partitioned by said piston.

4. In a speed change mechanism as set forth in claim 1, wherein said shift valve assembly comprises a shift valve for controlling ports in communication with said power source, said servo cylinder, and drain ports.

5. In a speed change mechanism as set forth in claim 2, wherein the cam groove member is comprised of two cam grooves disposed independently of and opposite to each other in said cam assembly.

6. In a speed change mechanism as set forth in claim 2, wherein said cam groove member is a unitary cam groove having ends which do not meet each other.

7. In a speed change mechanism as set forth in claim 2, wherein said groove member is a unitary cam groove in the form of a continuous closed loop.

* * * * *